United States Patent
Richardson et al.

(10) Patent No.: US 11,877,023 B2
(45) Date of Patent: Jan. 16, 2024

(54) CONTROL DEVICES AND SYSTEMS INCORPORATING SECURE CONTACTLESS REMOTE CONTROL AND ASSOCIATED METHODS

(71) Applicant: Aveo Systems, Inc., Marietta, GA (US)

(72) Inventors: Craig Richardson, Marietta, GA (US); Steve Joiner, Marietta, GA (US); Thomas M. Drewes, Marietta, GA (US)

(73) Assignee: Aveo Systems, Inc., Marietta, GA (US)

( * ) Notice: Subject to any disclaimer, the term of this patent is extended or adjusted under 35 U.S.C. 154(b) by 259 days.

(21) Appl. No.: 17/320,532

(22) Filed: May 14, 2021

(65) Prior Publication Data

US 2021/0360311 A1 Nov. 18, 2021

Related U.S. Application Data

(60) Provisional application No. 63/025,363, filed on May 15, 2020.

(51) Int. Cl.
| | |
|---|---|
| *H04N 21/422* | (2011.01) |
| *G06F 21/44* | (2013.01) |
| *G06K 7/14* | (2006.01) |
| *G06Q 10/1093* | (2023.01) |
| *H04L 9/40* | (2022.01) |
| *G05B 15/02* | (2006.01) |

(52) U.S. Cl.
CPC ......... *H04N 21/4222* (2013.01); *G06F 21/44* (2013.01); *G06K 7/1417* (2013.01); *G06Q 10/1095* (2013.01); *H04L 63/083* (2013.01); *G05B 15/02* (2013.01)

(58) Field of Classification Search
CPC .. H04N 21/4222; G06F 21/44; G06K 7/1417; G06Q 10/1095; H04L 63/083
See application file for complete search history.

(56) References Cited

U.S. PATENT DOCUMENTS

| | | | |
|---|---|---|---|
| 9,288,198 B2 * | 3/2016 | DeSoto | G06Q 20/3276 |
| 10,185,921 B1 * | 1/2019 | Heller | G07C 9/38 |
| 2009/0115898 A1 * | 5/2009 | Park | H04H 60/04 |
| | | | 348/553 |

(Continued)

*Primary Examiner* — Nnenna N Ekpo
(74) *Attorney, Agent, or Firm* — Troutman Pepper Hamilton Sanders LLP; Christopher C. Close, Jr.; Korbin M. Blunck (57) ABSTRACT

The disclosed technology includes commercial and residential automation and control (including audio-visual control) devices and systems incorporating contactless remote control. The disclosed technology can include a method of controlling an audio-visual system. The method can include displaying an authorization code on an audio-visual control device. The method can include receiving, at the audio-visual control device and from the remote server, instructions to change a setting of the audio-visual system, the instructions having been received by the remote server from a user device that has been authenticated by the remote server via the authorization code. The method can include outputting, to the audio-visual system, the instructions to change a setting of the audio-visual system and outputting, to the remote server, data indicative of a status of the audio-visual system.

18 Claims, 5 Drawing Sheets

(56) References Cited

U.S. PATENT DOCUMENTS

| | | | | |
|---|---|---|---|---|
| 2014/0313282 A1* | 10/2014 | Ma | ......................... | H04N 7/141 |
| | | | | 348/14.09 |
| 2015/0067080 A1* | 3/2015 | Cho | ...................... | H04L 67/025 |
| | | | | 709/206 |
| 2016/0380782 A1* | 12/2016 | Tanaka | ...................... | H04Q 9/00 |
| | | | | 340/870.07 |
| 2023/0051492 A1* | 2/2023 | Pognant | .............. | H04L 12/2816 |

* cited by examiner

FIG. 3

CONTROL DEVICES AND SYSTEMS INCORPORATING SECURE CONTACTLESS REMOTE CONTROL AND ASSOCIATED METHODS

CROSS REFERENCE TO RELATED APPLICATIONS

This application claims priority to U.S. Provisional Patent Application No. 63/025,363 filed 15 May 2020, the contents of which are incorporated herein by reference in their entirety as if set forth verbatim.

FIELD OF THE TECHNOLOGY

The presently disclosed subject matter generally relates to improved commercial and residential automation and control (including audio-visual control) devices and systems, and more specifically, to commercial and residential control devices and systems incorporating contactless remote control.

BACKGROUND

Conventional commercial and residential automation systems provide a single point of control for various audio-visual, lighting and environmental components is a room or meeting space. Additionally, some systems offer a 'remote control' feature through a web portal (or application) that allows a user (typically an administrator or support staff) to access the room control user interface on their personal device. Such 'remote control' typically requires the user to enter some configuration information on both their user device and the audio-visual control device. With growing concerns related to contact germs from touching shared items in the workplace, it would be desirable to have a system where users can gain control with their personal devices without the need of physically contacting one or more shared devices.

Accordingly, there is a need for improved audio-visual control devices and systems incorporating contactless remote control.

SUMMARY

The disclosed technology relates generally to improved commercial and residential automation and control (including audio-visual control) devices and systems, and more specifically, to commercial and residential control devices and systems incorporating contactless remote control.

The disclosed technology can include a method of controlling an audio-visual system. The method can include displaying, on an audio-visual control device, an authorization code. The method can include receiving, at the audio-visual control device and from the remote server, instructions to change a setting of the audio-visual system. The instructions can be received by the remote server from a user device that has been authenticated by the remote server via the authorization code. The method can include outputting, from the audio-visual control device and to the audio-visual system, the instructions to change a setting of the audio-visual system and outputting, from the audio-visual control device and to the remote server, data indicative of a status of the audio-visual system.

The authorization code can be or include a Quick Response (QR) code displayed on the audio-visual control device and the user device can connect to, and be authenticated by, the remote server in response to a user scanning the QR code with the user device.

The authorization code can be or include a code displayed on the audio-visual control device. The user device can connect to, and be authenticated by, the remote server in response to a user opening a browser on the user device and inputting the authorization code.

The method can include sending, by the audio-visual control device and to the remote server, a request for the authorization code. The method can include receiving, at the audio-visual control device and from the remote sever, the authorization code. The audio-visual control device can be configured to display the authorization code in response to having received the authorization code from the remote server.

The audio-visual control device can be configured to display the authorization code at a predetermined time. The predetermined time can be based, at least in part, on a scheduled meeting time. The audio-visual control device can be configured to display the authorization code after a predetermined amount of time since an input was last received by the audio-visual control device.

The audio-visual control device can be configured to display the authorization code in response to detecting a presence of a user. The user device can be a smart phone.

The method can include detecting, by the audio-visual control device, one or more equipment of the audio-visual system in communication with the audio-visual control device. In response to detecting the one or more equipment, the method can include displaying, on the audio-visual control device, an option to control the one or more equipment.

The method can include receiving, at the audio-visual control device, a request to de-authorize the user device. In response to receiving the request to de-authorize the user device, the method can include de-authorizing the user device.

The disclosed technology can include an audio-visual control system. The audio-visual control system can include one or more audio-visual equipment and an audio-visual control device. The audio-visual control device can include one or more processors and a memory in communication with the one or more processors and storing instructions that, when executed by the one or more processors, cause the audio-visual control device to perform certain actions. The instructions can cause the audio-visual control device to send, to a remote server, a request for an authorization code. The instructions can cause the audio-visual control device to receive, from the remote sever, the authorization code and display the authorization code.

The instructions can cause the audio-visual control device to receive, from the remote server, instructions to change a setting of the one or more audio-visual equipment. The instructions can be received by the remote server from a user device that has been authenticated by the remote server via the authorization code.

The instructions can cause the audio-visual control device to output the instructions to the one or more audio-visual equipment to change a setting of the one or more audio-visual equipment and output, to the remote server, data indicative of a status of the one or more audio-visual equipment.

The authorization code can be or include a Quick Response (QR) code displayed on the audio-visual control device. The user device can connect to, and be authenticated by, the remote server in response to a user scanning the QR code with the user device.

The authorization code can be or include a code displayed on the audio-visual control device and the user device can connect to, and be authenticated by, the remote server in response to a user opening a browser on the user device and inputting the authorization code.

The audio-visual control device can be configured to display the authorization code at a predetermined time. The predetermined time can be based, at least in part, on a scheduled meeting time. The audio-visual control device can be configured to display the authorization code after a predetermined amount of time since an input was last received by the audio-visual control device.

The audio-visual control device can be configured to display the authorization code in response to detecting a presence of a user. The user device can be a smart phone.

The instructions, when executed by the one or more processors, can be further configured to cause the audio-visual control device to detect the one or more audio-visual equipment in communication with the audio-visual control device and, in response to detecting the one or more audio-visual equipment, display an option to control the one or more audio-visual equipment.

The instructions, when executed by the one or more processors, can be further configured to cause the audio-visual control device to receive a request to de-authorize the user device and, in response to receiving the request to de-authorize the user device, de-authorize the user device.

Additional features, functionalities, and applications of the disclosed technology are discussed herein in more detail.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Disclosed are improved audio-visual control devices and systems incorporating contactless remote control to allow a user to control their room on a user's personal user device. As will be appreciated, such a system allows a user in a room with an audio-visual control device to securely receive and control the exact same user interface from the shared touch screen of the audio-visual control device onto their personal device without having to touch the shared touch screen. For example, a connected user device can allow a user to safely and securely control their audio-visual system in their room (e.g., make phone calls, turn on/off displays, launch video calls, switch video inputs, control lighting, adjust volume, mute microphones, etc.) all from their own device without having to contact a shared touch screen or other shared audio visual equipment installed in the room.

In some examples, the audio-visual device may be connected to a cloud computer network to allow simplified connection and system configuration. In some examples, touchless access may be provided by bar code, a Quick Response (QR) Code, a secure URL, Bluetooth or ultrasonic communication, other acoustic, or visual communication (e.g., lights, flashing screens, shapes, etc.). For example, a user device may scan a QR code being displayed on the audio-visual control device and may pass associated data to a cloud or local network to gain control access. As will be appreciated, such technologies may provide the advantage of limiting access to users who are in the room and have access to the audio-visual control device. In other examples, other technology may be utilized which may enable broader distance between user devices and control devices.

The improved audio-visual control devices and systems may limit user device control based on various conditions, such as, but not limited to, some amount of time passing, when the next meeting starts, when some number of remote control sessions is reached, user's physical proximity to the room or touch screen, etc.

For example, a system can be provided with time-based, or meeting-based, authorization so that users don't have access to control the room outside of their defined time window or meeting, or the user moves outside a securely defined proximity to the controller. Additionally, a system can use the next scheduled meeting to de-authorize currently authorized users.

The improved audio-visual control devices and systems may determine and track connected users. For example, the system can log local device IP addresses and other device identifiers (MAC address, WAN Address, etc.) for archival and reporting purposes. Further, the system can whitelist or blacklist networks to ensure access is limited. Additionally, the system can support a variable number of users with remote control capability. For example, the system may utilize predefined or dynamically changing administrative settings in an associated cloud platform. Further the system may de-authorize all users from the touch panel to fully take control from the touch panel. Additionally, the system can display the number of remote users connected to the system and allow for local de-authorization of the users directly from one or more system devices. De-authorization can be initiated at the audio-visual control device or by a remote server.

In some examples the touch screen of the audio-visual control device will allow for a user to read/scan the screen without having to touch the screen to wake and brighten the screen. As non-limiting examples, the touch screen may remain illuminated when idle, detect when users are physically close and brighten the screen, or brighten the screen at a time when user devices can be connected (e.g., when the next scheduled meeting is about to begin). Additionally, in some examples, a remote system server can be hosted in the cloud or hosted locally for networks that don't support WAN access.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein.

Figure 1:
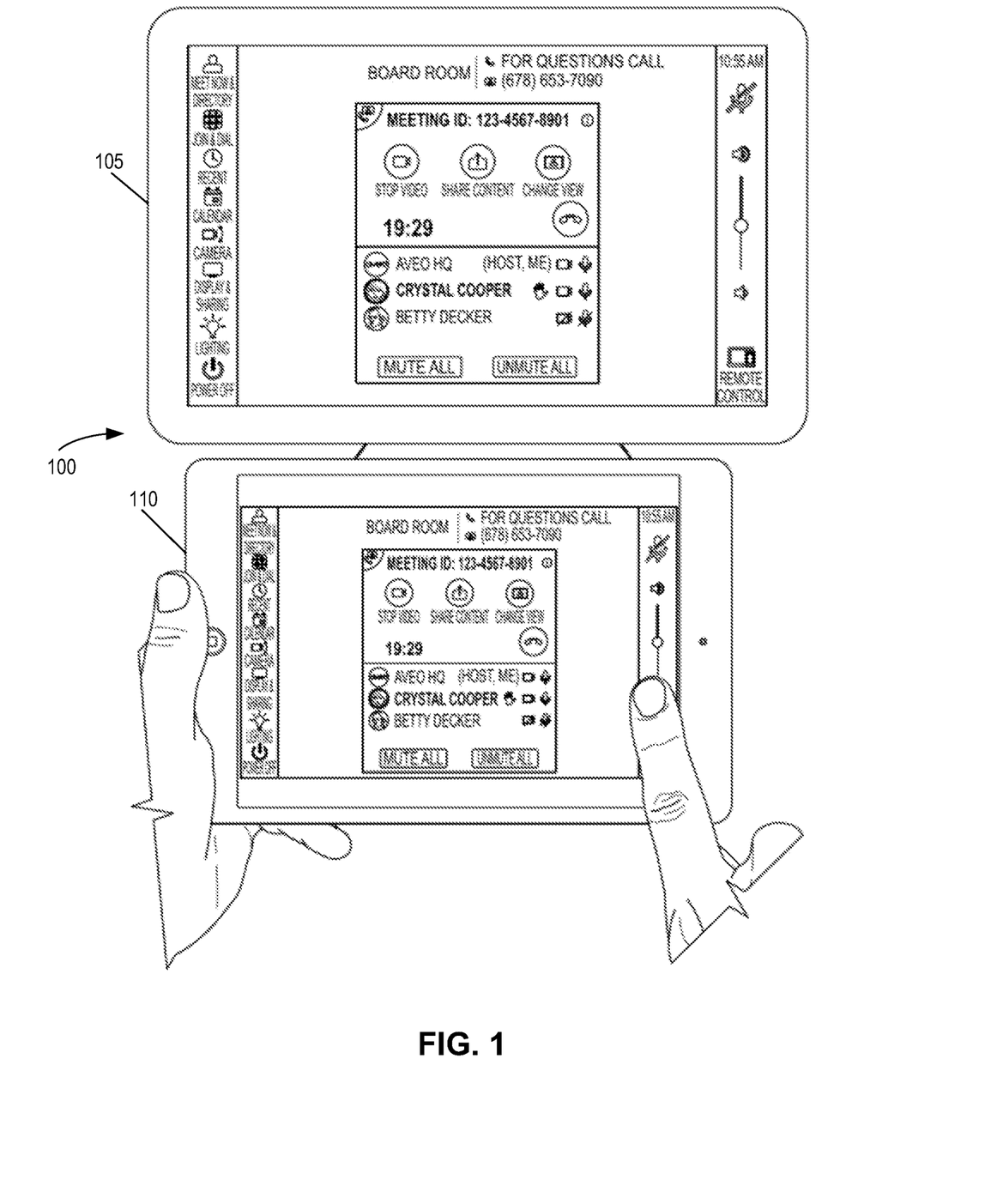
FIG. 1 illustrates an audio-visual system incorporating contactless remote control, according to an example of the present disclosure.

FIG. 1 illustrates an audio-visual system 100 incorporating contactless remote control, according to an example of the present disclosure. As depicted, the system may include an audio-visual control device 105 and a user device 110. As further shown, the user device 110 can receive and control the exact same user interface from the shared touch screen of the audio-visual control device 105. For example, a connected user device can allow a user to safely and securely control their audio-visual system in their room (e.g., make phone calls, turn on/off displays, launch video calls, switch video inputs, control lighting, adjust volume, mute microphones, etc.) all from their own device. As further described herein, the user can utilize the user device 110 to control audio-visual equipment in a room connected to audio-visual control device 105 without having to contact a shared touch screen or other shared audio-visual equipment installed in the room.

The audio-visual control device 105 can be a computing device with a display screen that is configured to display information about the audio-visual system 100. The audio-visual control device 105 can be configured to be mounted on a wall, placed on a table, placed on a podium, or installed in any suitable location for the application. The audio-visual control device 105 can also be configured to receive inputs from a user via a touchscreen, a handheld input device such as a computer mouse or a remote control, a microphone with the audio-visual control device 105 being enabled for voice control, or other similar devices and methods of receiving inputs from a user. Although described herein as an audio-visual control device 105, the audio-visual control device 105 can be configured to control other equipment that can be connected to the audio-visual control device 105 and is not limited to audio or visual equipment. For example, the audio-visual control device 105 can be configured to control other equipment such as heating ventilation and air conditioning systems, ceiling fans, space heating, water heaters, security systems (alarms, door locks, cameras, etc.), room lighting, and other various equipment or systems that can be in communication with the audio-visual control device 105.

The user device 110 can be a mobile or portable computing device such as a smart phone, a tablet, a laptop computer or any other mobile or portable device that can connect wirelessly to a remote server and/or the audio-visual control device 105. For example, the user device 110 can be a smart phone and the user can connect wirelessly either directly to the audio-visual control device 105 or a remote server to control various components of the audio-visual system 100.

Figure 2A:
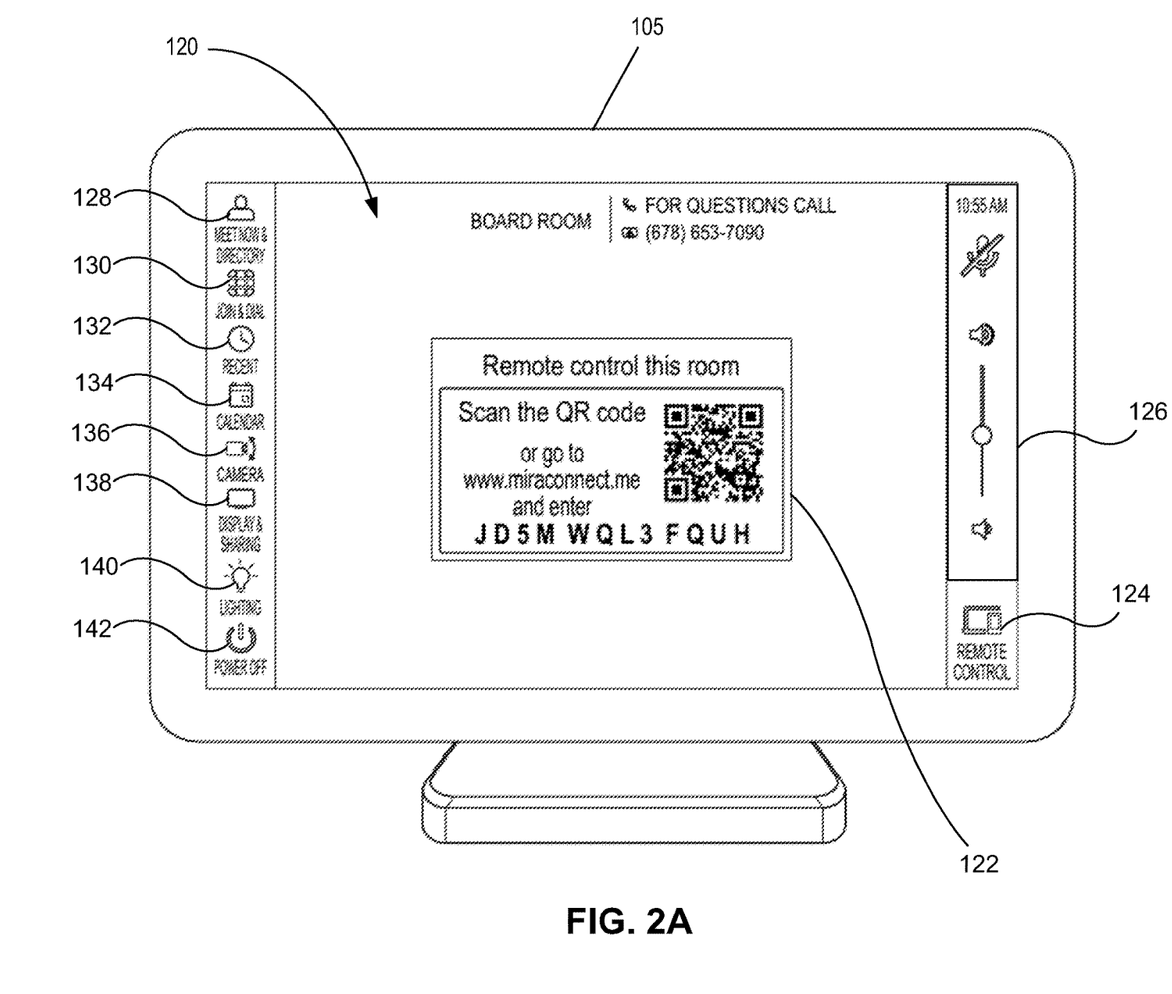
FIGS. 2A, 2B, and 2C illustrates various audio-visual systems incorporating contactless remote control, according to examples of the present disclosure.

FIG. 2A depicts an audio-visual control device 105 of an example audio-visual system 100 incorporating contactless remote control, according to examples of the present disclosure. As shown, the audio-visual control device 105 can include a user interface 120 that can display information about the system as well as various control options for a user to select to control the audio-visual system 100.

The audio-visual control device 105 can automatically reconfigure or rearrange the user interface 120 to change the options that are displayed on the user interface 120 depending on what equipment is connected to the audio-visual control device 105. The audio-visual control device 105 can have stored settings (e.g., a device driver or other settings enabling the audio-visual control device 105 to interact with equipment), or download settings from a remote server, to enable the audio-visual control device 105 to detect and interact with equipment. As a non-limiting example, detection and control of the various equipment can be accomplished by the audio-visual control device 105 enabling a driver to interact with an application programming interface (API) of the various equipment. The driver can be pre-stored in the audio-visual control device's 105 memory or downloaded from a remote server. For example, the audio-visual control device, the remote server, or both, can have a stored library of various device drivers that can enable the audio-visual control device 105 to detect and interact with equipment when connected to the audio-visual control device 105 or at least installed in the audio-visual system 100. The audio-visual control device 105 can be configured to interact with the various equipment using a communication protocol for the particular equipment. As a non-limiting example, the audio-visual control device 105 can be configured to communication with a camera using an industry standard such as Sony's® VISCA protocol. As an illustrative example, if the room where the audio-visual system 100 is installed has a camera, the audio-visual control device 105 can detect the connection of the camera to the audio-visual control device 105, via stored settings or settings downloaded from a remote server, and adapt the user interface 120 to display control options for a user to control the camera. As another illustrative example, if the room where the audio-visual system 100 is installed has a projector screen, the audio-visual control device 105 can detect the connection of the projector screen and adapt the user interface 120 to display control options for a user to control the projector screen. As will be appreciated by one of skill in the art, the audio-visual control device 105 can be configured to automatically adapt the user interface 120 for control of various other equipment that can be connected to the audio-visual control device 105 including, but not limited to, television screens, video conference systems, computers, speakers, room lighting, microphones, ceiling fans, heating ventilation and air conditioning systems, door locks, security systems, telephones, and various other devices that can be connected to the audio-visual control device 105.

Alternatively, or in addition, a user can input commands to the audio-visual control device 105 to reconfigure the user interface 120 to display controls for the various equipment connected to the audio-visual control device 105. For example, the user can select various settings to enable the audio-visual control device 105 to display controls for the various equipment connected to the audio-visual control device. As another example, the user can select and hold an icon until the user interface 120 indicates that the various icons on the user interface 120 can be reconfigured (moved, deleted, added, etc.). In any of these examples, the same basic user interface 120 can be displayed (with different options available) on the audio-visual control device 105 to provide a consistent user interface between various applications.

At times, various users of the audio-visual system 100 may want to control the audio-visual system 100 without touching the audio-visual control device 105. For example, the various users may be concerned about potentially coming into contact various germs on the audio-visual control device 105 or the audio-visual control device 105 may not be conveniently located. To facilitate control of the audio-visual system 100 without contacting the audio-visual control device 105, the audio-visual control device 105 can output a signal to permit connection of one or more user devices 110. For example, and as depicted, audio-visual control device 105 can display a connect box 122 with at least one method for accessing remote control by the user device 110. As shown, audio-visual control device 105 can display multiple methods, such as a QR code or a temporary passcode to be scanned or entered by user device 110 to gain access to control the audio-visual system 100. The audio-visual control device 105 can be configured to display the connect box 122 to allow for remote connection to the audio-visual system 100 without a user needing to touch the screen. For example, the audio-visual control device can be configured to display the connect box 122 when a user selects the remote-control icon 124, after timing out after a predetermined length of time, near a time when a scheduled meeting is to begin, when the presence of a user is detected (e.g., as detected by motion or other presence sensor), or any other suitable method to ensure the connect box 122 is displayed when a user is likely to want to connect to the audio-visual system 100. As another example, audio-visual control device 105 can output other signals receivable by user device 110, such as, but not limited to secure URL, Bluetooth or ultrasonic communication, other acoustic, or visual communication (e.g., lights, flashing screens, shapes, etc.).

Once connected, the audio-visual control device 105 can include a remote-control icon 124 that can indicate whether the audio-visual control device 105 is being remotely controlled by one or more user devices 110. A user can select the remote-control icon 124 to view which devices are remotely connected to the audio-visual control device 105 and can select which, if any, of the remotely-connected user devices 110 should be disconnected or denied the ability to remotely-control the audio-visual control device 105.

When connected, the user device 110 can display the same control options as the user interface 120 of the audio-visual control device 105. As non-limiting examples, the user interface 120 of the audio-visual control device 105 (and the user device 110) can include the following control options: a communication control 126, a contact directory 128, a dial pad 130, a recent history tab 132, a calendar 134, camera control 136, display control 138, lighting control 140, and/or power control 142.

The communication control 126 can include various options for controlling the communication devices in the room. For example, the communication control 126 can include a mute button for muting any microphones in the room. If multiple microphones are in the room, the communication control 126 can include options for muting all or some of the microphones. The communication control 126 can be further configured to indicate when a microphone is muted or when it is unmuted by including visual indicators such as a red light for muted and a green light for unmuted, a flashing indicator for unmuted and a constant indicator for unmuted, and/or the microphone icon can include a slash through the icon when muted and lack a slash through the icon when unmuted. As another example, the communication control 126 can include an option to control a camera installed in the room (not shown in FIG. 2A). If multiple cameras are installed in the room, the communication control 126 can include options for controlling all or some of the cameras in the room. The communication control 126 can include volume controls for the speakers in the room. If multiple speakers are in the room, the communication control 126 can include options for controlling the volume on all or some of the speakers in the room. The communication control 126 can also include an option for controlling which audio is delivered to the speakers in the room. For example, the communication control 126 can control which microphone or sound source (e.g., a television, computer, or other device) should have its sound played from the various speakers in the room.

The contact directory 128 can provide access to a directory of users that can be connected to the audio-visual system 100, for example, via a video conferencing program or a telephone system. The information for the users in the contact directory 128 can be automatically downloaded from equipment that is part of the room (e.g., a Zoom Rooms® video conferencing system could have its own directory, imported from an online or network directory, or manually inputted. A user of the audio-visual system 100, either via the audio-visual control device 105 or the user device 110, can select users to invite to the meeting by selecting the users from the contact directory 128. Furthermore, the dial pad 130 can allow a user to manually dial a phone number or input meeting identification information to connect another user to the audio-visual system 100.

The recent history tab 132 can display information related to recent calls or meetings made using the audio-visual system 100. For example, the recent history tab 132, can display all phone calls, video call, meetings held, or other information related to past use of the audio-visual system 100. A user can select the various historical data to display information about past use of the audio-visual system 100 and to redial previous users called from the audio-visual control device 105, reschedule a past meeting, or other similar actions.

The calendar 134 can be selected by a user to display scheduling information for the room, for a particular user, and or for various other meetings or events scheduled by the organization. For example, the calendar 134 can be selected by a user to view all upcoming meetings scheduled for the particular room with the audio-visual system 100. A user can also schedule a meeting using the calendar 134 to reserve the room and add various attendees to the meeting to invite them to the meeting. Furthermore, a user can select the calendar 134 to select a meeting and initiate a meeting. For example, the user can select a current meeting to start the meeting. Once a meeting is initiated, the various participants in the meeting can be allowed into a virtual meeting room or contacted to add the participant to the meeting. Alternatively, or in addition, the calendar 134 can be configured to automatically initiate the meeting once the scheduled meeting time has begun.

The camera control 136 can be selected by a user to display control options for controlling one or more cameras in the room. The camera control 136, for example, can include controls for selected specific cameras, panning, tilting, zooming specific cameras, selecting preset settings for each camera, enabling auto-tracking for a camera, or other various controls for each camera. The camera control 136 can also display information about the number of participants detected by the camera or other various information that can be detected by the camera or detected by a system that receives video data from the camera.

The display control 138 can be selected by a user to manage one or more display devices in the room. For example, the display control 138 can display options for controlling a television screen, a computer screen, a projector and projector screen, or any other display devices in the room. Furthermore, the display control 138 can include enabling video blank (make the screen dark) or freeze (freeze the last image on the display) features, content sharing for video conferencing, changing channels on television tuners, controlling playback on a digital video recorder or media player, navigating a tuner's guide or menus, or other similar controls for various display devices.

The lighting control 140 can be selected by a user to control various lighting devices in the room. For example, the lighting control 140 can provide an interface for a user to select all or some of the lights in the room to dim, turn on, or turn off some or all of the lights in the room. The lighting control 140 can also include various options for a user to select preset lighting settings (e.g., a presentation setting, a conference setting, a dining setting, a safety setting, etc.).

The power control 142 can be selected by a user to power on or off the audio-visual system 100, the audio-visual control device 105, and/or individual components of the audio-visual system 100 (e.g., a display screen, an HVAC system, a security system, a camera, etc.). The power control 142 can also be configured to reset the various settings of the audio-visual system 100 when powered off and back on (e.g., resetting audio levels, muting or unmuting the microphones, dimming the audio-visual control device 105 screen, arming a security alarm, etc.). The audio-visual control device 105 can also be configured to include an automatic power-on and power-off schedule such that all or selected equipment in the audio-visual system 100 can be powered-on or powered-off at selected times.

Figure 2B:
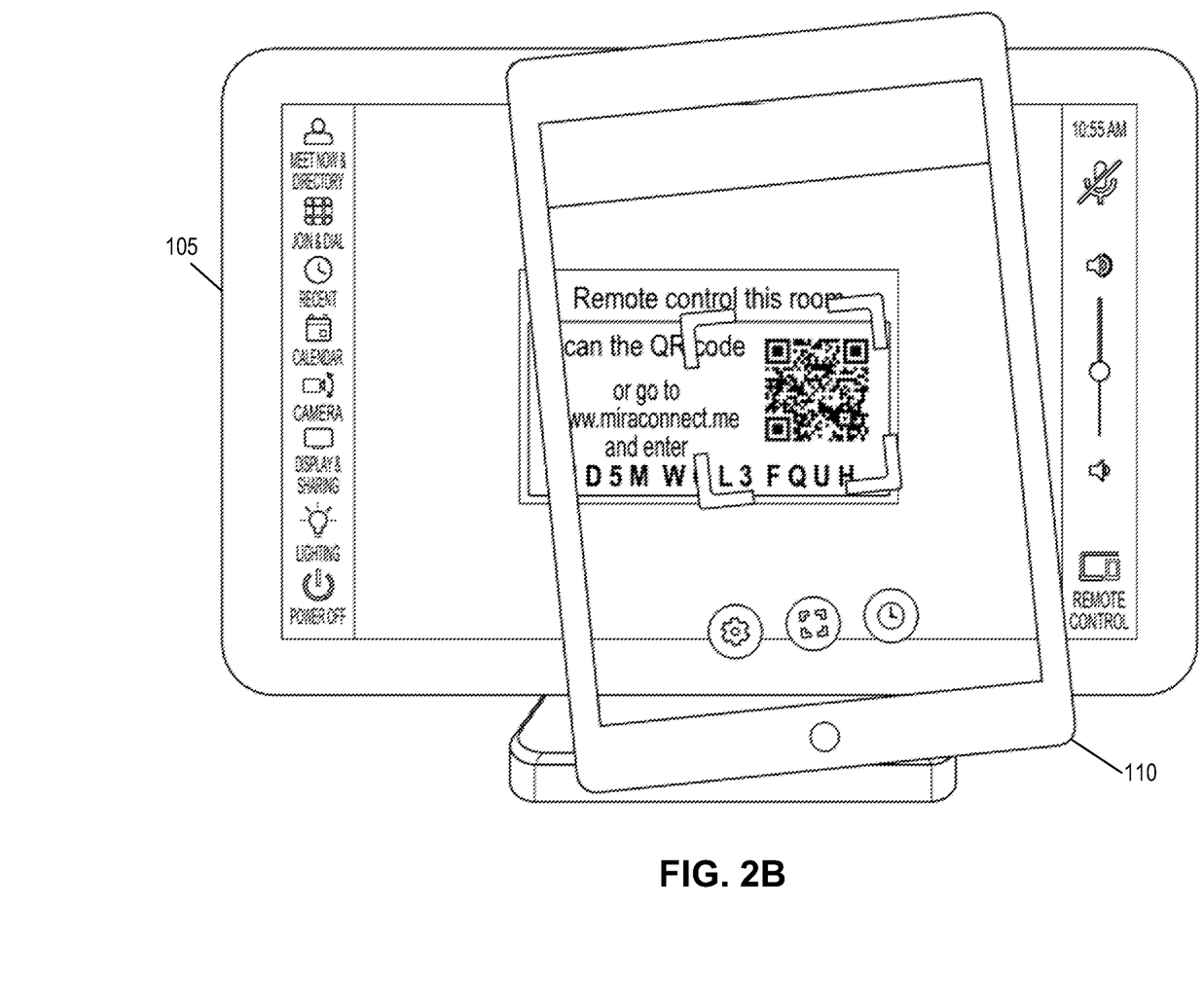

FIG. 2B depicts an audio-visual control device 105 and a user device 110 of an example audio-visual system 100 incorporating contactless remote control, according to examples of the present disclosure. As shown, user device 110 can receive the signal output by the audio-visual control device 105. For example, user device 110 may capture the QR code visible on the audio-visual control device 105 via an input device, such as a camera. As will be appreciated by one of skill in the art, upon scanning the QR code, the user device 110 can connect via the internet to a browser which is connected to a remote server. The remote server can be configured to facilitate control of the audio-visual system 100 via the user device 110. Alternatively, or in addition, if the user opens a browser and inputs the information for connecting the user device 110 to the audio-visual system 100, the user device 110 can similarly connect to a remote server to facilitate control of the audio-visual system 100 via the user device 110.

Figure 2C:
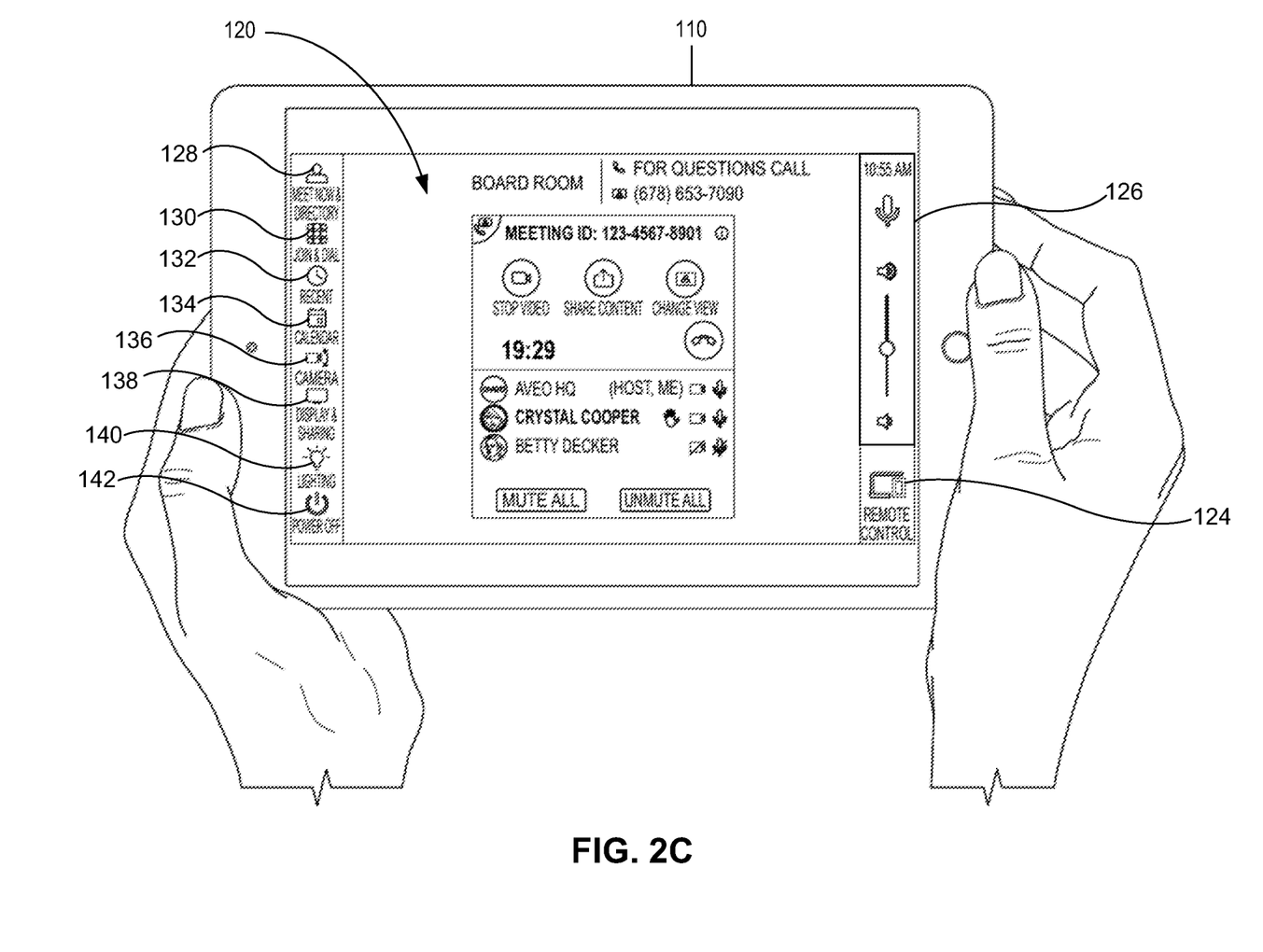

As depicted in FIG. 2C, once the signal is received, user device 110, may display a user interface 112 for controlling the audio-visual system 100. The user interface 112 can display the same options as user interface 120. For example, the user interface 112 can display a remote-control icon 124, a communication control 126, a contact directory 128, a dial pad 130, a recent history tab 132, a calendar 134, camera control 136, display control 138, lighting control 140, and/or power control 142. When the user inputs a command to the user device 110 via the user interface 112, the user device 110 can output instructions to a remote server which can, in turn, output instructions to the audio-visual control device 105 to control the audio-visual system 100.

Figure 3:
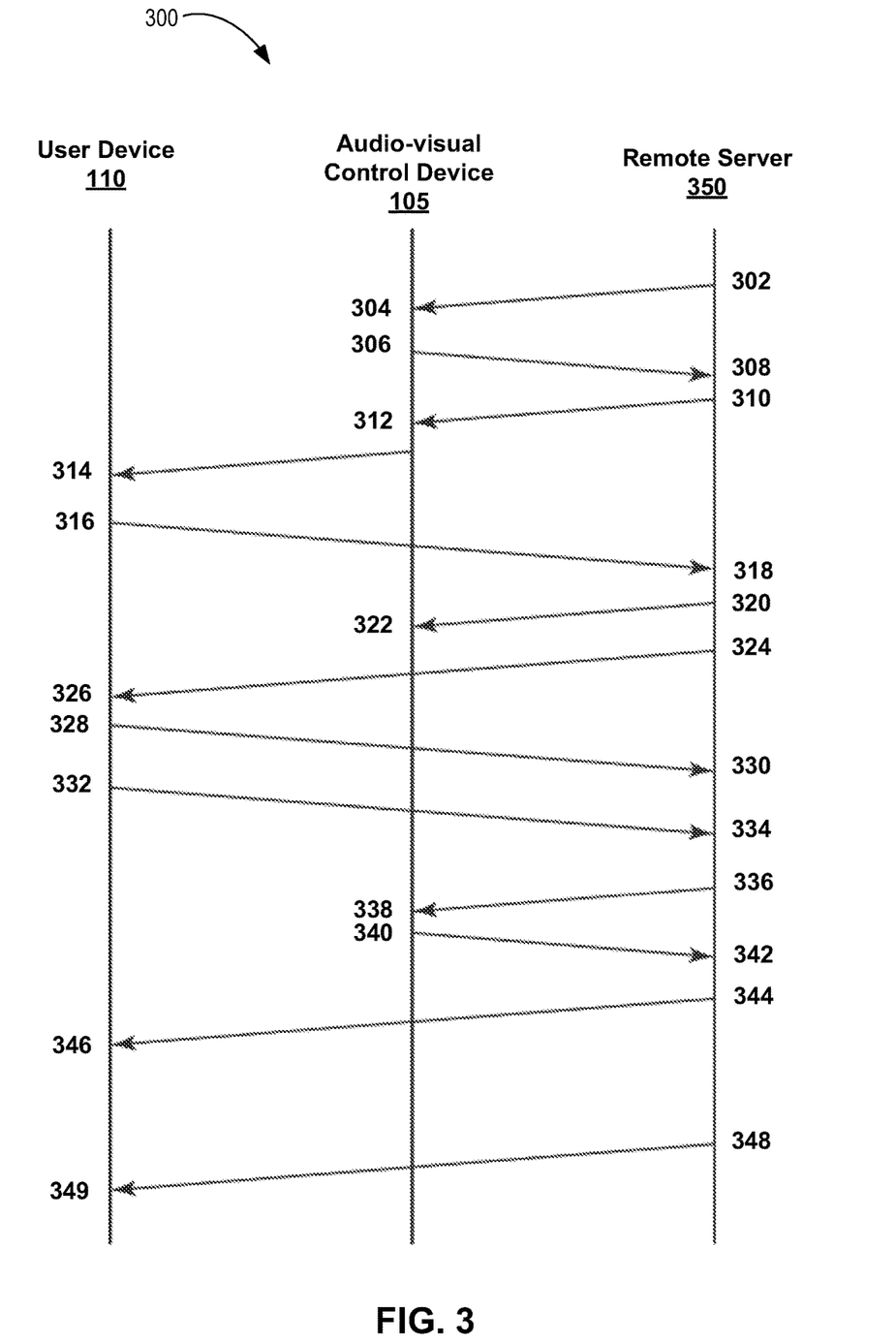
FIG. 3 is a system flow diagram of an audio-visual system incorporating contactless remote control, according to an example of the present disclosure.

FIG. 3 is a system flow diagram 300 of an audio-visual system 100 incorporating contactless remote control, according to an example of the present disclosure. As depicted, the remote server can output 302 a signal to the audio-visual control device 105 to enable 304 touchless control of the audio-visual control device 105 through the remote server 350. The remote server 350 can be a server that is located remotely and accessed via an internet connection. Alternatively, the remote server 350 can be a server that is on-premises and accessed via a local network. Once enabled 304, the audio-visual control device 105 can request 306 an authorization code from the remote server 350 or display an authorization code that has been pre-set or stored in a memory of the audio-visual control device 105. The remote server 350 can then validate 308 the request 306, look up the authorization code, generate the authorization code, and store the authorization code and the identification number of the audio-visual control device 105. The remote server 350 can then send 310 back the authorization code if the audio-visual control device 105 is properly authenticated. The audio-visual system 100 can then use the authorization code to display 312 on the audio-visual control device 105 or to cause the audio-visual control device 105 to output a signal via Bluetooth low energy, or an inaudible acoustic signal for connection with user devices 110. A user desiring room control can use a user device 110 to scan 314 the QR code, enter in the authorization code into the user device 110, connect via Bluetooth Low Energy, or other similar methods described herein. The user device 110 can then send 316 the authorization code in a request for authentication to the remote server 350 to begin controlling the equipment in the room. The remote server 350 can validate 318 the request, look up the authorization code and the identification number of the audio-visual control device 105, look up the identification number of the room that the audio-visual control device 105 is paired with, and store the IP address information and other identifiers (MAC address, WAN address, etc.) of the user device 110 for historical purposes and/or future identification and authentication.

In some examples, once the code has been used, a new authorization code can be sent 320 to the audio-visual system 100 to display 322 the new authorization code for the next user. Further, once the user device 110 has requested authentication from the remote server 350, the remote server 350 can output 324 a custom authorization token to the user device 110 to authorize the user device 110 to temporarily connect to the remote server 350 and have access to control the audio-visual system 100. The user device can receive 326 the authorization token and send 328 back authentication data to the remote server 350 to finalize the authentication process. The remote server 350 can then update 330 the count and information of each authenticated user device 110 connected to the remote server 350.

Once the user device 110 is authenticated, the control interface for the audio-visual system 100 can open in a browser on the user device 110 and facilitate control of the audio and visual equipment in the room via the browser. As will be appreciated, such a system allows the user to control the room from their user device 110 without the need for downloading an application to the user device 110. For example, the user-interface 120 can be rendered in a browser on the user device 110 using a secure https connection to the remote server 350 (either cloud-based server or a locally hosted server). Alternatively, or in addition, an application can be downloaded to the user device 110 that can be used to facilitate authentication of the user device 110 and control of the audio and visual equipment in the room. As depicted, changes to settings of the audio-visual system 100 (e.g., mute microphone, dim the lights, turn on a screen, etc.) made on the user device 110 can be sent 332 as a command to the remote server 350 which can receive the command to change the settings 334. The remote server 350 can send 336 the command to the audio-visual control device 105. The audio-visual control device 105 can receive 338 the change in settings command from the remote server 350 and send commands as necessary to the equipment in the room and receives status information back from the equipment. This status information can be sent 340 to the remote server 350 which can receive 342 the status information. The status information can be sent 344 by the remote server 350 back to the personal device 110 which can be received 346 by the user device 110 and update the user interface to reflect the changes from the audio-visual system 100. This back-and-forth exchange (332-346) between the user device 110, the remote server 350, and the audio-visual control device 105 can be repeated for each changed setting of the audio-visual system 100 inputted to the user device 110 by the user. The personal device 110 and the audio-visual control device 105 in the room, and any other connected remote-control sessions can reflect the same status of the audio-visual system 100.

In some examples, a user's session can be disabled by the remote server 350 sending 348 a signal to the user device 110 to disable the session. The user device 110 can display 349 that the session has ended. The user's session, for example, can be disabled under several conditions including, but not limited to (1) when a pre-set time window expires, (2) when a user moves outside of a defined proximity to the controller (e.g., when the user device 110 is detected to be outside of a predefined proximity to the audio-visual control device 105 as detected by geolocation tracking, or when the user device 110 is no longer connected to a particular network in the building, or when the user device 110 is no longer connected to a particular network to which the audio-visual control device 105 is also connected to, or when the user device 110 is no longer within range of a Bluetooth or other signal from the audio-visual control device 105, etc.), (3) when the next meeting (when the room has a calendar assigned to it) becomes active on the audio-visual system 100 (plus or minus some time period to allow people to gain control before a meeting starts), (4) when manually de-authorized by a user de-authorizing specific remote users from the audio-visual control device 105 in the room, (5) automatically de-authorized if a limit of remote users has been reached and another user attempts to gain control, de-authorizing the first personal device, and/or (6) when deauthorized via the remote server either by a preset setting or a user sending commands to the remote server to de-authorize a user and, in response, the server de-authorizing the user.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling an audio-visual system, the method comprising:
   displaying, on an audio-visual control device, an authorization code;
   receiving geolocation data indicative of a location of a user;
   determining whether the user is within a predefined proximity to the audio-visual control device;
   receiving, at the audio-visual control device and from a remote server, instructions to change a setting of the audio-visual system, the instructions having been received by the remote server from a user device that has been authenticated by the remote server via the authorization code;
   outputting, from the audio-visual control device and to the audio-visual system, the instructions to change a setting of the audio-visual system; and
   outputting, from the audio-visual control device and to the remote server, data indicative of a status of the audio-visual system,
      wherein the audio-visual control device is configured to (1) display the authorization code only during a predetermined time period that is based on a scheduled meeting time, (2) deauthorize the authorization code at a time outside of the predetermined time period, and (3) deauthorize the authorization code in response to determining that the user is outside of the predefined proximity to the audio-visual control device.

2. The method of claim 1, wherein the authorization code comprises a Quick Response (QR) code displayed on the audio-visual control device, and
   wherein the user device connects to, and is authenticated by, the remote server in response to a user scanning the QR code with the user device.

3. The method of claim 1, wherein the authorization code comprises a code displayed on the audio-visual control device, and
   wherein the user device connects to, and is authenticated by, the remote server in response to a user opening a browser on the user device and inputting the authorization code.

4. The method of claim 1 further comprising:
   sending, by the audio-visual control device and to the remote server, a request for the authorization code; and
   receiving, at the audio-visual control device and from the remote sever, the authorization code, wherein the audio-visual control device is configured to display the authorization code in response to having received the authorization code from the remote server.

5. The method of claim 1, wherein the audio-visual control device is configured to display the authorization code after a predetermined amount of time since an input was last received by the audio-visual control device.

6. The method of claim 1, wherein the audio-visual control device is configured to display the authorization code in response to detecting a presence of a user.

7. The method of claim 1, wherein the user device comprises a smart phone.

8. The method of claim 1 further comprising:
   detecting, by the audio-visual control device, one or more equipment of the audio-visual system in communication with the audio-visual control device; and
   in response to detecting the one or more equipment, displaying, on the audio-visual control device, an option to control the one or more equipment.

9. The method of claim 1 further comprising:
   receiving, at the audio-visual control device, a request to de-authorize the user device; and
   in response to receiving the request to de-authorize the user device, de-authorizing the user device.

10. An audio-visual control system comprising:
    one or more audio-visual equipment;
    a presence sensor; and
    an audio-visual control device, the audio-visual control device comprising:
       one or more processors; and
       a memory in communication with the one or more processors and storing instructions that, when executed by the one or more processors, cause the audio-visual control device to:
          send, to a remote server, a request for an authorization code;
          receive, from the remote sever, the authorization code;
          in response to receiving an indication from the presence sensor that a user is present near the audio-visual control device, display the authorization code;
          receive geolocation data indicative of a location of the user;
          determine whether the user is within a predefined proximity to the audio-visual control device;
          in response to determining that the user is outside of the predefined proximity to the audio-visual control device, deauthorize the authorization code;
          receive, from the remote server, instructions to change a setting of the one or more audio-visual equipment, the instructions having been received by the remote server from a user device that has been authenticated by the remote server via the authorization code;
          output the instructions to the one or more audio-visual equipment to change a setting of the one or more audio-visual equipment; and
          output, to the remote server, data indicative of a status of the one or more audio-visual equipment.

11. The audio-visual control system of claim 10, wherein the authorization code comprises a Quick Response (QR) code displayed on the audio-visual control device, and
    wherein the user device connects to, and is authenticated by, the remote server in response to a user scanning the QR code with the user device.

12. The audio-visual control system of claim 10, wherein the authorization code comprises a code displayed on the audio-visual control device, and
    wherein the user device connects to, and is authenticated by, the remote server in response to a user opening a browser on the user device and inputting the authorization code.

13. The audio-visual control system of claim 10, wherein the audio-visual control device is configured to display the authorization code at a predetermined time.

14. The audio-visual control system of claim 13, wherein the predetermined time is based, at least in part, on a scheduled meeting time.

15. The audio-visual control system of claim 10, wherein the audio-visual control device is configured to display the authorization code after a predetermined amount of time since an input was last received by the audio-visual control device.

16. The audio-visual control system of claim 10, wherein the user device comprises a smart phone.

17. The audio-visual control system of claim 10, wherein the instructions, when executed by the one or more processors, are further configured to cause the audio-visual control device to:
- detect the one or more audio-visual equipment in communication with the audio-visual control device; and
- in response to detecting the one or more audio-visual equipment, display an option to control the one or more audio-visual equipment.

18. The audio-visual control system of claim 10, wherein the instructions, when executed by the one or more processors, are further configured to cause the audio-visual control device to:
- receive a request to de-authorize the user device; and
- in response to receiving the request to de-authorize the user device, de-authorize the user device.

\* \* \* \* \*